(12) United States Patent
Fayewicz et al.

(10) Patent No.: US 7,861,404 B2
(45) Date of Patent: Jan. 4, 2011

(54) METHOD FOR REMOVING THE ENDPLATE OF AN ELECTRIC GENERATOR

(75) Inventors: Ryan J. Fayewicz, Temple, PA (US); George F. Dailey, Pittsburgh, PA (US); Eric McDonald, North Huntingdon, PA (US)

(73) Assignee: Siemens Energy, Inc., Orlando, FL (US)

( * ) Notice: Subject to any disclaimer, the term of this patent is extended or adjusted under 35 U.S.C. 154(b) by 1112 days.

(21) Appl. No.: 11/583,289

(22) Filed: Oct. 19, 2006

(65) Prior Publication Data

US 2008/0092374 A1 Apr. 24, 2008

(51) Int. Cl.
*B23P 19/00* (2006.01)

(52) U.S. Cl. .............................. 29/729; 29/596; 29/732; 29/735; 29/742

(58) Field of Classification Search ................... 29/729, 29/732, 735, 738, 742, 783, 596, 426.1; 310/254; 72/407, 416, 453, 452.7; 418/142
See application file for complete search history.

(56) References Cited

U.S. PATENT DOCUMENTS

| | | | | |
|---|---|---|---|---|
| 4,854,034 A | * | 8/1989 | Archibald et al. | 29/596 |
| 5,787,754 A | * | 8/1998 | Carrion et al. | 72/407 |
| 5,875,540 A | * | 3/1999 | Sargeant et al. | 29/596 |
| 6,404,095 B1 | * | 6/2002 | Hsu | 310/254.1 |
| 6,448,686 B1 | * | 9/2002 | Dawson et al. | 310/216.051 |

* cited by examiner

*Primary Examiner*—Derris H Banks
*Assistant Examiner*—Tai Nguyen

(57) ABSTRACT

A method and apparatus for compressing the endplate of an electric generator to relieve the restraining force on a plurality of key blocks that restrain the endplate in compression. The method includes simultaneously applying independent compressive loads at each of the key block locations to the endplate to relieve pressures on the key blocks and removing the key blocks so the endplate can be removed.

12 Claims, 6 Drawing Sheets

ND FOR REMOVING THE ENDPLATE
METHOD FOR REMOVING THE ENDPLATE OF AN ELECTRIC GENERATOR

BACKGROUND OF THE INVENTION

1. Field of the Invention

This invention pertains generally to tools for servicing electric generators and more particularly to a tool for removing the endplate from a WESTAC electric generator.

2. Related Art

Commonly large electric generator stators are made up of a tandem array of iron laminations that are held in compression between endplates. Most generators of that type have through bolts holding the endplates and the laminated core together. The through bolts allow for easy removal and access to the core for field maintenance inspections and servicing. However, WESTAC electric generators, manufactured by Siemens Power Generation, Inc., do not have through bolts. This latter type of electric generators core is held together by 15 key bars or blocks that maintain an endplate in compression against the core laminations. In order to remove the endplate, which is a large Bellville washer, it is necessary to compress and flatten the endplate to relieve the pressure off of the key bars so that they may be removed. The current method of flattening the endplate is by the use of a single four inch by 93 inch diameter plate that weights over 7,000 pounds (3175.14 kg.). FIG. 1 shows a planned view of a skeleton of an electric generator oriented in the vertical position normally used for stacking the laminations, with the prior art compression plate 12 in place. The compression plate 12 is held in position against the endplate 24 by a first end portion of all thread 14. All thread 14 passes through the compression plate 12 and extends past the length of the core where it is captured at a second end by a leverage plate 15 that spans the opposite end of the generator frame. A hydraulic jack 20 fits over the all thread 14 and seats against the compression plate 12. The hydraulic jack 20 is locked in position on the all thread 14 by a jack nut 16 and a thrust washer 18. The hydraulic jack 20 exerts a compressive force on the endplate 24 through a cast iron spider 22 that extends between the back face of the compression plate 12 and the hydraulic jack 20. This current system requires the use of a large overhead crane to position the 7000 lb. (3175.14 kg.) compression plate. In addition, it has only been used in the factory with the WESTAC frame in the vertical position. It could probably be adapted for use in the field with the generator frame in the horizontal position, but extensive modifications would be required to install and use this large compression tool for field applications. Cranes large enough to install the compression tool typically cost upwards of $1,000 (E822.45) per day, so it is important to minimize such auxiliary equipment costs.

Accordingly, an improved tool is desired that will enable compression of a WESTAC endplate without the use of an overhead crane.

Furthermore, a new tool is desired that is easier to use in the field than the methods currently being employed and that will reduce costs.

SUMMARY OF THE INVENTION

This invention provides an improved method of removing the endplate of an electric generator that is held in compression against a core of the generator at a first end by a plurality of key bars that are supported in place against the generator frame. Each key bar has a slot which captures a peripheral arc of the circumference of the endplate to hold the endplate in compression. The plurality of key bars are substantially evenly spaced around the circumference of the generator frame. The method of this invention is more amendable to field maintenance procedures and less costly to operate than the methods heretofore employed. The method comprises simultaneously leveraging a separate compression tool independently off of the generator frame adjacent each key bar to apply a compressive load upon an exposed surface of the endplate sufficient to loosen the endplate from the key bars. Once the endplate is sufficiently compressed the key bars and the endplate can be removed from the generator frame. Preferably, each compression tool is pivotally attached to an end portion of the generator frame adjacent the corresponding key bar that the compression tool is associated with.

In the preferred embodiment, the compression tool comprises a housing having a first end of a laterally extending arm pivotally attached proximate to one end of the housing. A second end of the laterally extending arm is attached to the end portion of the frame adjacent the corresponding key bar. Desirably, the laterally extending arm comprises two parallel plates that are attached proximate to the one end of the housing with a pivot pin. The end portion of the generator frame adjacent the key bar is captured between the two parallel plates of the second end of the laterally extending arm with a pivot pin that extends through aligned bores in each of the parallel plates and the end portion of the generator frame. An anchor rod extends through the interior of the generator and is anchored at a first end of the anchor rod against a second axial end of the generator and connected at a second end of the anchor rod proximate to a second end of the housing of the compression tool such that the second end of the housing can move axially along the anchor rod. A portion of the housing, intermediate the first and second ends of the housing, contacts the endplate. The endplate is compressed by moving the second end of the housing axially along the second end of the anchor rod in the direction of the interior of the generator. Means are provided for moving the second end of the housing along the second end of the anchor rod, comprising a hollow hydraulic cylinder that captures the anchor rod within its piston. Preferably, the portion of the housing intermediate the first and second ends of the housing that contacts the endplate is a stand-off or pedestal that protrudes from the housing and is rigidly attached thereto. Once the endplate has been removed the core laminations may be held in place with a plurality of anchor rods respectively positioned with wood slot filler in empty coil slots in the core laminations.

In another embodiment of the invention, where core laminations have been replaced, the separate compression tools may be used to compress intermediate stacks of the laminations together. In this embodiment, the separate compression tools are leveraged off of the generator frame at a plurality of locations around the circumference of the generator at the same time to apply a compressive load upon a face of an exposed lamination. To that end, the compression tool comprises a housing having a first end pivotally attached to the generator frame. An anchor rod that extends through the interior of the generator and is anchored at a first end of the anchor rod against a second axial end of the generator is connected at a second end of the anchor rod proximate to a second end of the housing of the compression tool such that the second end of the housing can move axially along the anchor rod. A push rod extends axially from and is supported by the housing intermediate the first and second ends of the housing. The push rod, at an extended end, contacts the face of the generator lamination and compresses the laminations when the housing is moved axially along the second end of the anchor rod in the direction of the laminations.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
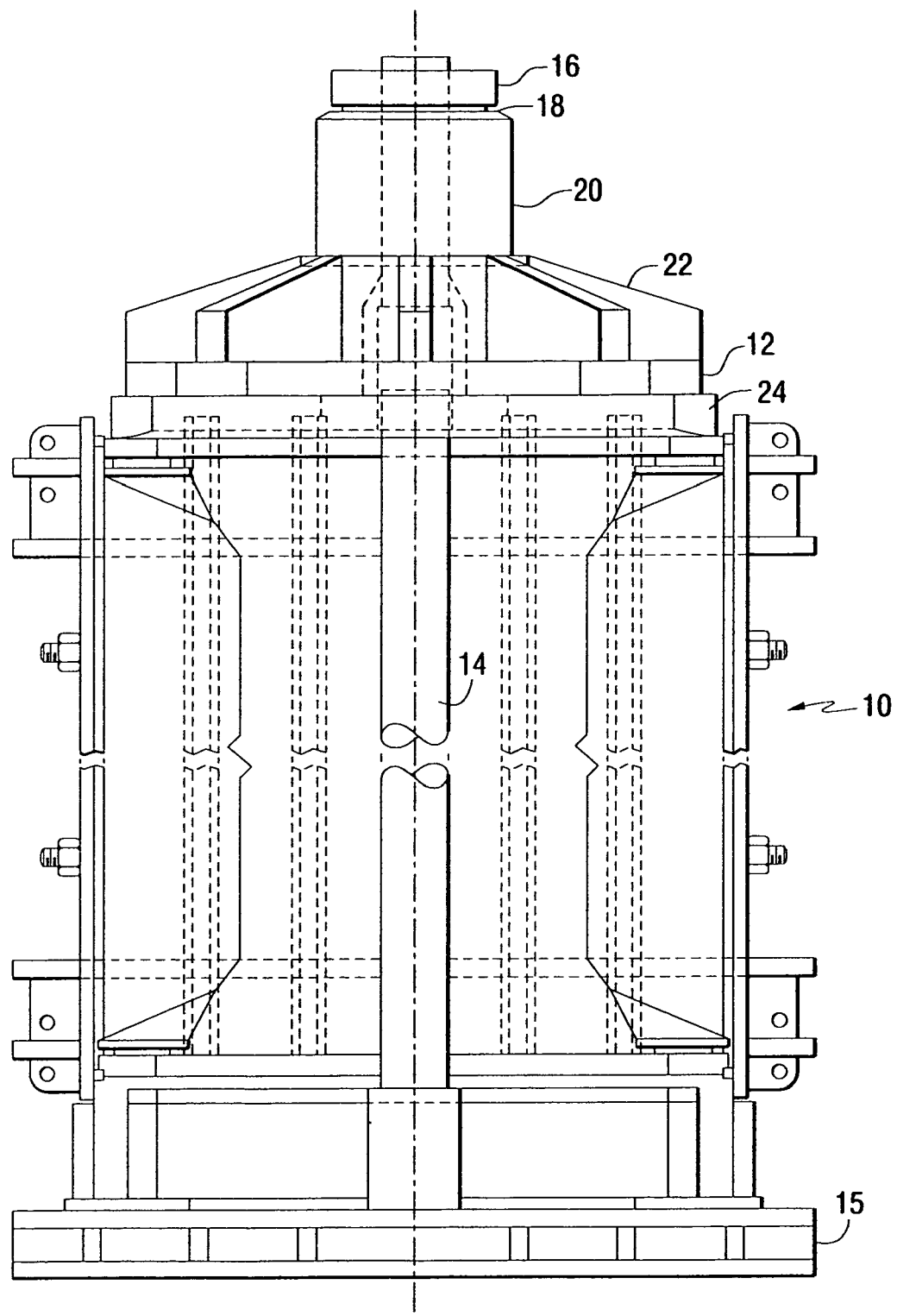
FIG. 1 is a planned view of the shell of a WESTAC electric generator in a vertical position with a prior art compression loading plate in place.
Figure 2:
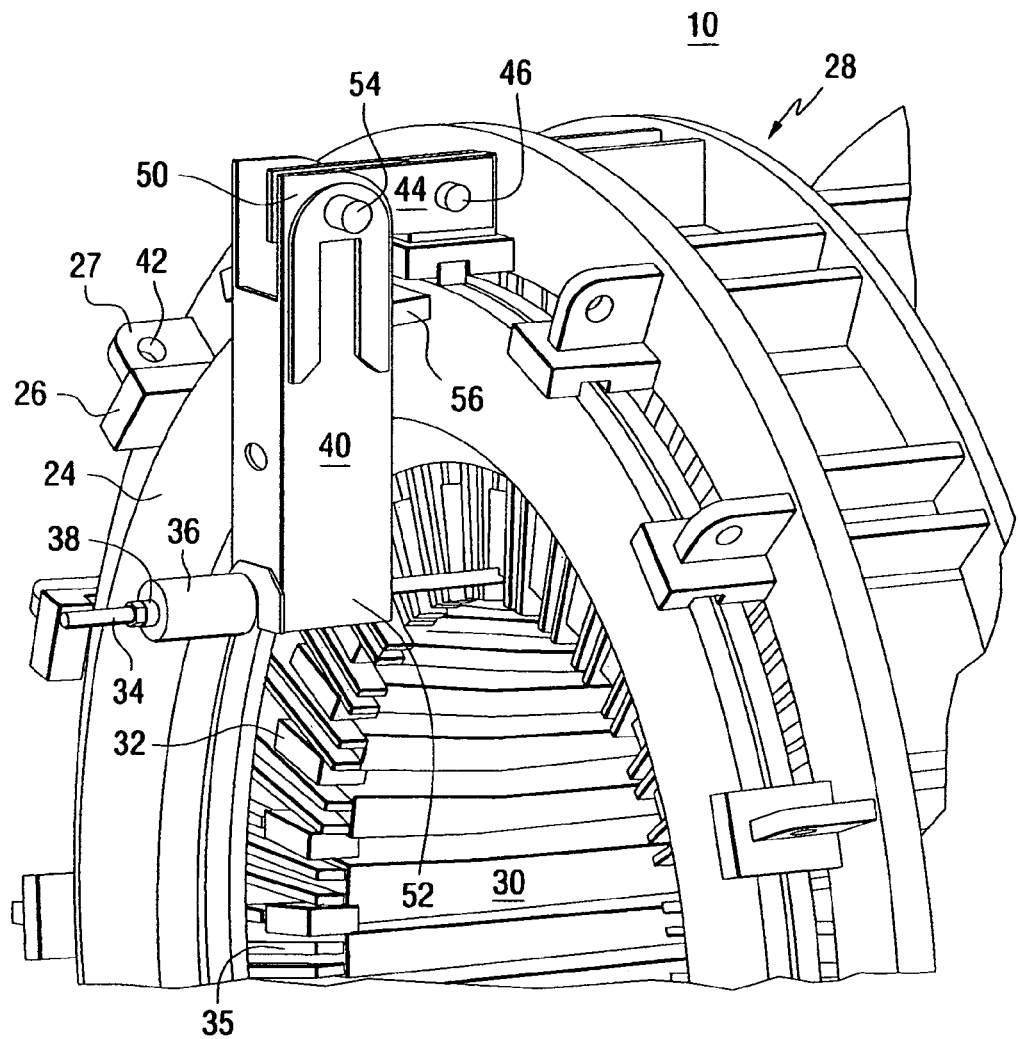
FIG. 2 is a perspective view of an end section of a WESTAC generator with a single compression tool of this invention connected between the end of the generator frame adjacent a key bar and an anchor rod.
Figure 2A:
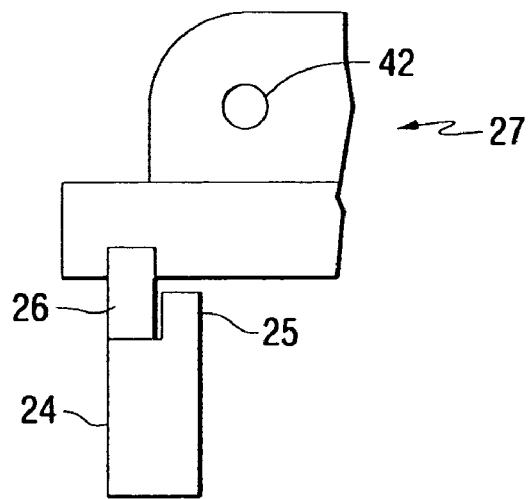
FIG. 2A is an enlarged view of the endplate-key bar-frame extension connection.

FIG. 2 shows a perspective view of a portion of the end of a WESTAC generator with the external housing and the internal rotor removed. The stator core 30 is made up of a large number of iron laminations that are stacked in tandem and held in compression by the endplate 24, which is an extremely large Bellville washer under in excess of 1,160,000 pounds of compression. The stator core is restrained in the circumferential direction by the generator frame 28. The endplate 24 is captured in position and maintained under compression by key blocks or bars 26 that capture the peripheral edge of the endplate 24 in a notched groove. The key bars 26 are wedged between the endplate 24 and the frame extensions 27. FIG. 2A shows an enlarged view of the endplate-key bar-frame extension interface. The endplate 24 has a circumferential lip 25 that the key bar 26 is wedged against to retain the endplate in compression. The key bar 26, in turn, is captured in position by a groove in the underside of the frame extension 27.

The stator core laminations form a plurality of transverse slots 32 that extend axially the length of the core and are positioned around the entire internal circumference of the stator. The slots house the stator windings.

FIG. 2 shows a single compression tool 40 of this invention in position to compress the endplate 24. The compression tool 40 has a housing 48 that is connected at a first end 50 through a laterally extending arm 44 to the generator frame extension 27 by means of a connecting pin 46 which extends through a hole in the laterally extending arm 44 that matches with a mating hole 42 in the frame extension 27. The laterally extending arm 44 is pivotally connected to the first end 50 of the housing 48 through a pivot pin 54. An anchor rod 34, e.g., a 1.25 in. (3.18 cm) all thread, extends through a second end 52 of the housing 48 and fits in an empty coil winding slot and runs the length of the generator core. The all thread anchor rod 34 is reacted off the opposite end of the generator core by being bolted to plates which span adjacent to the generator finger plates 35. A hollow hydraulic cylinder 36 is placed over the end of the anchor rod that passes through the second end 52 of the housing 48 and is captured by an anchor nut 34. A pedestal or stand-off 56 extends outward from the housing 48 intermediate the first and second ends of the housing 50 and 52 in line with the endplate 24 and contacts the endplate. As the hydraulic cylinder 36 expands it will react off of the pin 54 and press inward on the endplate 24 transmitting a compressive load through the stand-off 56. In producing the WESTAC generators, the specifications call for a final nominal press of the core of 580 tons (5.16 MN). This works out to approximately 77,333 pounds (343.99 KN) of force required at each key 26 to be able to flatten the endplate 24. Through calculations, it is determined that approximately 2,800 psi (19.3 newtons/sq. mm.) at the location of the hydraulic cylinder is required to obtain the necessary force. A 30 ton (266.89 KN) hollow hydraulic cylinder, such as the Enerpac RCH 302 is sufficient for this purpose. The 2,800 psi (19.3 newtons/sq. mm.) was calculated for a hydraulic cylinder having a piston surface area equal to that of the RCH 302. The pressure will have to be adjusted for different piston surface areas. The RCH 302 hollow hydraulic cylinder is available from Enerpac, a Division of Actuant Corp., Milwaukee, Wis. However, it should be appreciated that other mechanical, pneumatic, or electrive motive forces can be employed to move the second end 52 of the housing 48 along the anchor rod 34 to provide a compressive load to the endplate 24. Wood slot filler and all thread is used in the empty winding slots 32 to hold the rest of the core together so that the endplate 24 can be removed after the keys 26 are taken out.

Figure 3:
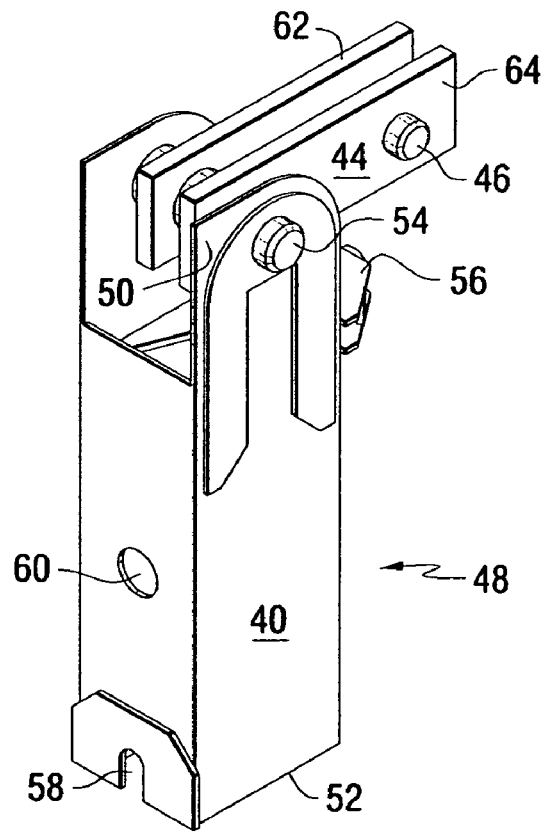
FIG. 3 is a perspective view of the compression tool of this invention.

FIG. 3 provides a perspective view of the compression tool 40 of this invention showing a better view of the laterally extending arm 44 which is made up of two parallel plates 62 and 64 that capture the hole 42 within the generator frame extension 27 therebetween through insertion of the pin 46. The anchor rod 34 passes through the slot 58 in the housing 48. In addition, there is a bore 60 that extends completely through the housing 48 for supporting a push rod, not shown in FIG. 3, which will be described in more detail hereafter.

Figure 4:
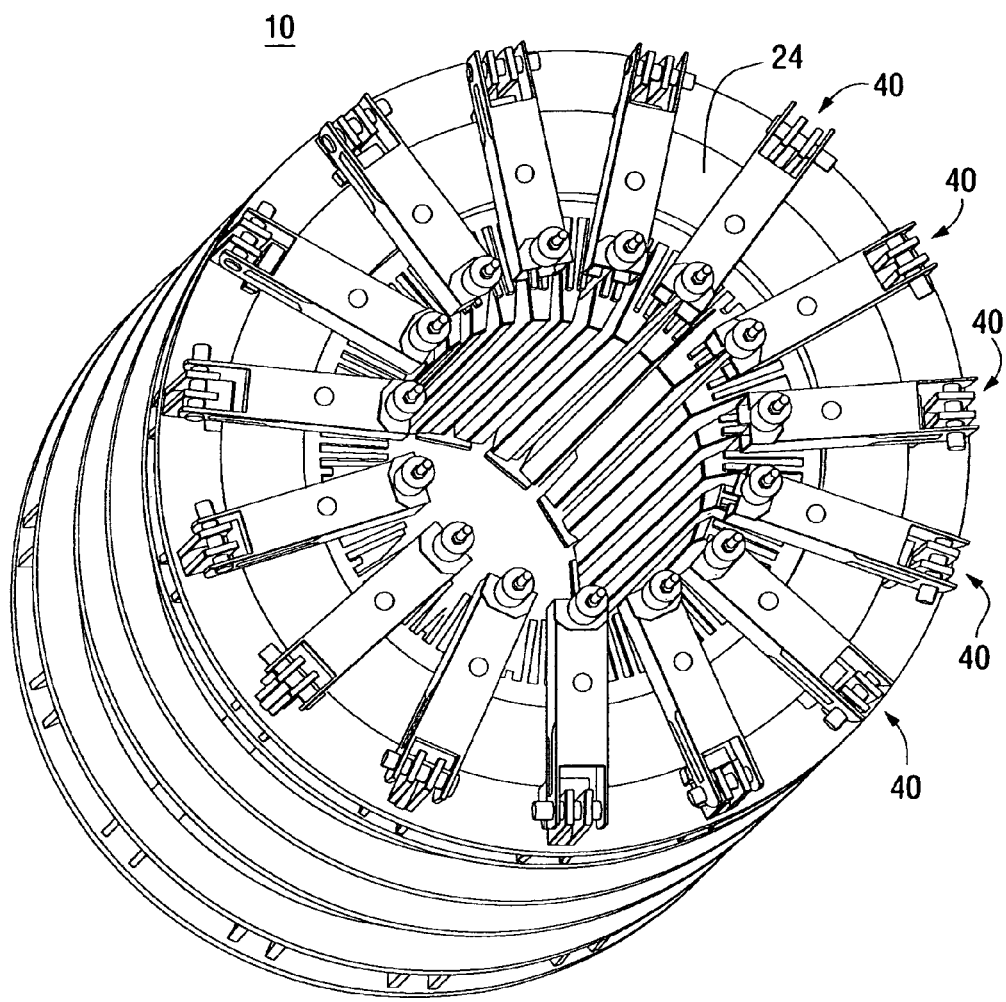
FIG. 4 is a perspective view of the endplate of a WESTAC generator with a plurality of compression tools in place engaging the generator frame adjacent the key bars, and the anchor rods.

In a WESTAC generator there are 15 key bars that are equidistantly spaced around the circumference of the electric generator. FIG. 4 illustrates that separate compression tools 40 are provided for each of the 15 key bars and operate simultaneously at their respective key bar locations to compress the endplate 24.

Figure 5:
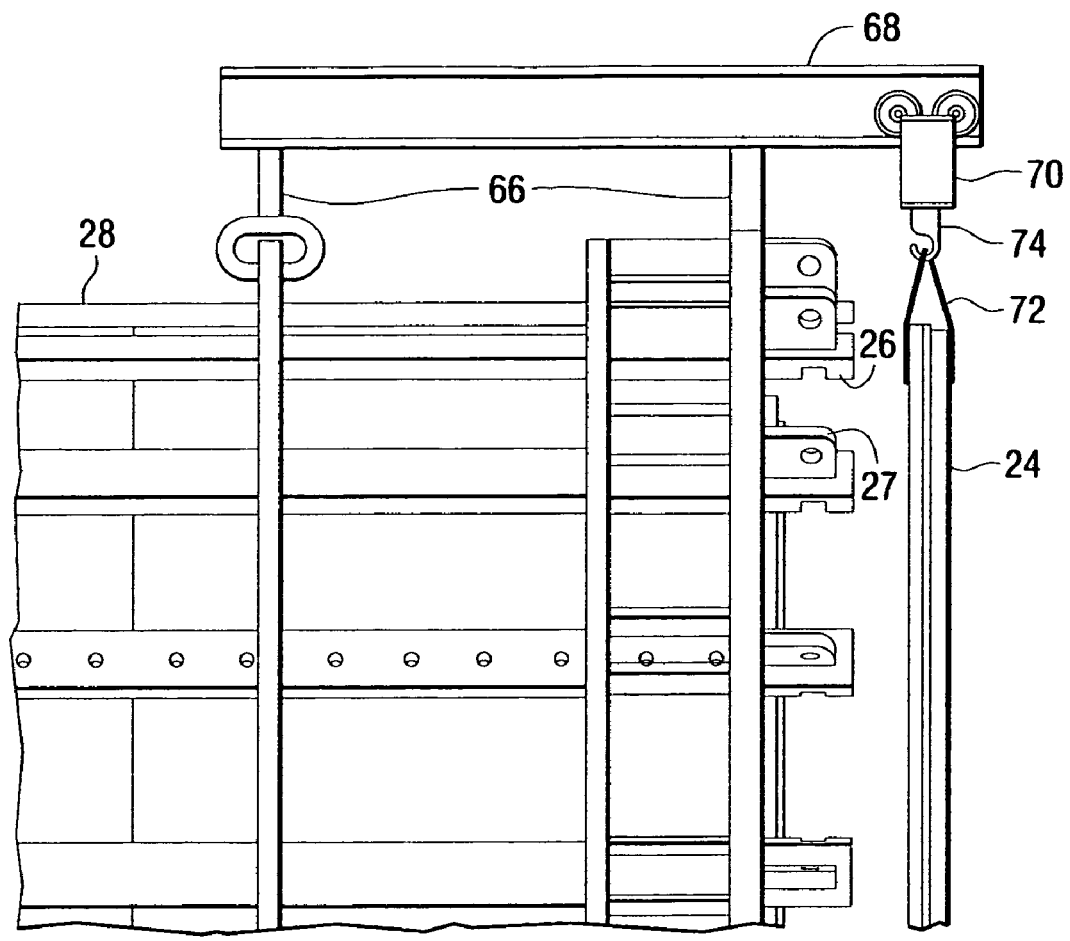
FIG. 5 is a planned view of a support structure and trolley system for moving the endplate of a WESTAC generator away from the core.

FIG. 5 illustrates a trolley set-up that can be employed to move the endplate 24 away from the generator 10. A trolley 70 rides on an I-beam 68 which is held in position by support columns 66. Preferably the I-beam is constructed out of a high strength aluminum alloy. A hook 74 can support a strap 72 which is wrapped around the endplate 24. Employing this arrangement the endplate 24 can be moved sufficiently away from the end of the generator 10 to permit access to the core for core iron replacement by standard techniques.

Figure 6:
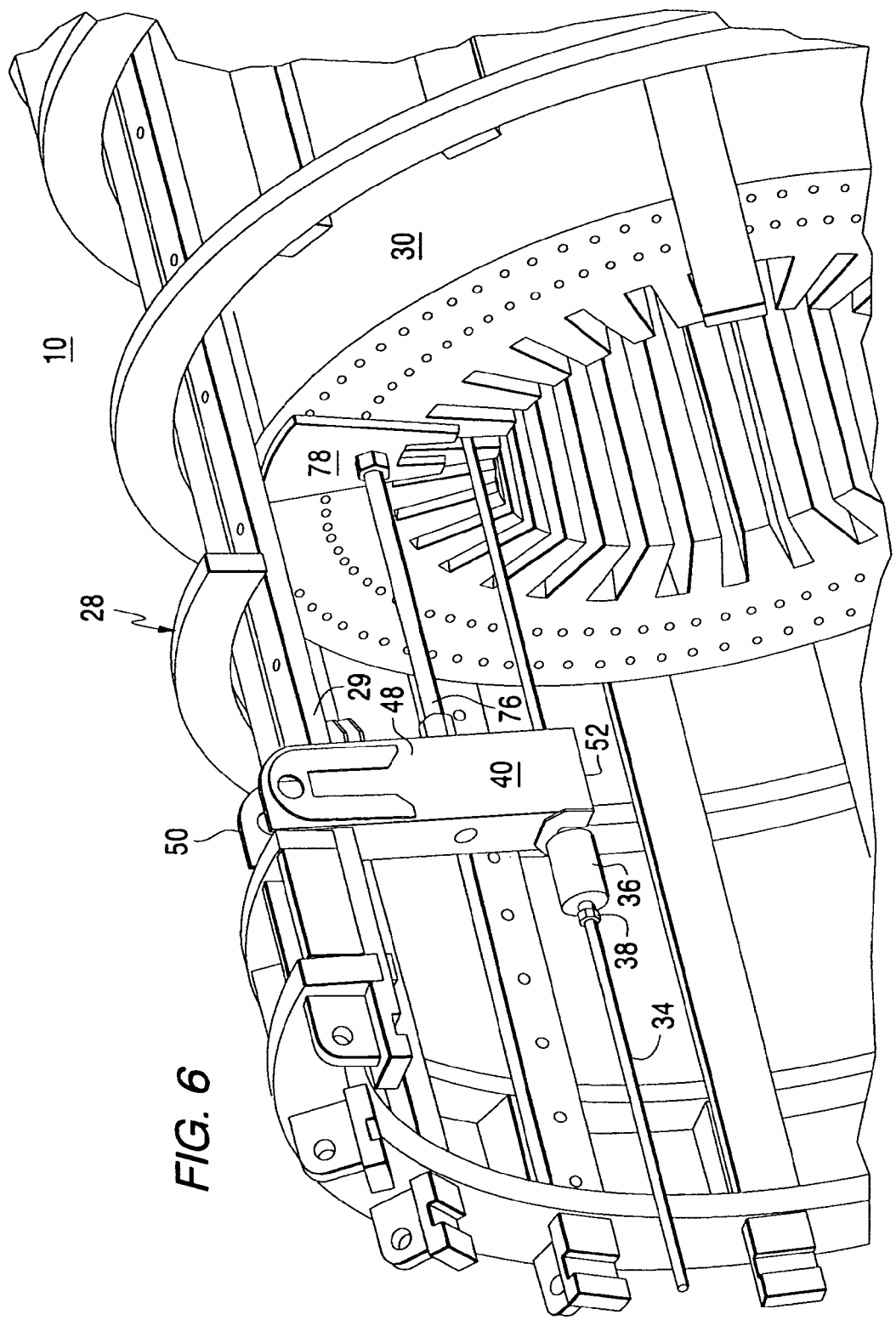
FIG. 6 is a perspective view of a rear portion of a WESTAC generator with a portion of the core iron removed and the compression tool of this invention in place to compress the exposed laminations.

After the core has been worked on, it will be necessary to compress the stacked tandem laminations ten times to 400 tons (3.56 MN) for every 18 inches of new iron replaced. The compression tool 40 of this invention is able to adapt itself to perform these intermediate presses as well. FIG. 6 illustrates a configuration of the tool 40 in position to perform a single intermediate press. A push rod 76 is supported by the housing 48 intermediate the first and second ends 50 and 52 and extends out parallel to the anchor rod 34 towards the core iron 30. The distal end of the push rod 76 is connected to an end plate 78 which spreads the load on the exposed surface of the core iron 30. The housing 48 is suspended and supported by the frame 28 at its first end 50. A longitudinal frame strut 29 is captured by the first end 50 of the housing 48 by insertion of the pin 54. The tool 40 functions in the same manner as previously explained for employing a compressive load to the end plate 24. However, in the embodiment shown in FIG. 6 the compressive load is imparted by the push rod 76 through the endplate 78. The push rod 76 can be retracted through the housing 48 through the housing slot 60 as more laminations are added, to further compress the core. Though only one compressive tool 40 is shown, it should be appreciated that the 15 identical compressive tools 40, as previously shown in FIG. 4, can function in this embodiment to provide compressive loads simultaneously around the circumference of the face of the exposed core iron.

After the core has been adequately compressed, the endplate can be restored employing the same method that was used for removing the endplate. The compression tools 40 will be used to flatten the endplate by simultaneously applying a compressive load around the circumference of the endplate so the keys may be replaced between the periphery of the endplate and the frame extensions 27. Accordingly, an improved method and apparatus is provided that does not require an overhead crane. Each of the 15 assemblies weighs approximately 65-70 pounds (29.48-31.75 kg.) and can easily be maneuvered by two people. One complete assembly can be readily set up in under 10 minutes and the cost of materials is significantly less than that of the 7,000 lb. prior art compression plate.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A method for removing the endplate of an electric generator that is held in compression against a frame of the generator at a first end of the generator by a plurality of key bars that are supported in place against the generator frame, an end portion of each key bar having a slot which captures a peripheral arc of the circumference of the endplate to hold the endplate in compression, the plurality of key bars being substantially evenly spaced around the circumference of the generator frame, the method comprising the steps of:
   leveraging a separate compression tool independently off of each key bar at the same time to apply a compressive load upon an exposed surface of the endplate sufficient to loosen the endplate from the key bars; and
   removing the endplate from the generator frame.

2. The method of claim 1 including the step of pivotally attaching the compression tool to the end portion of the corresponding key bar that the compression tool is leveraged off of.

3. The method of claim 2 wherein the compression tool comprises a housing having a first end of a laterally extending arm pivotally attached proximate to one end of the housing including the step of pivotally attaching a second end of the laterally extending arm to the end portion of the key bar.

4. The method of claim 3 wherein the laterally extending arm comprises two parallel plates that are attached proximate to the one end of the housing with a pivot pin including the step of capturing the end portion of the key bar between the two parallel plates of the second end of the laterally extending arm with a pivot pin that extends through aligned bores in each of the parallel plates and the end portion of the key bar.

5. The method of claim 3 wherein the compression tool includes an anchor rod that extends through the interior of the generator and is anchored at a first end of the anchor rod against a second axial end of the generator and connected at a second end of the anchor rod proximate to a second end of the housing of the compression tool such that the second end of the housing can move axially along the anchor rod, wherein a portion of the housing intermediate the first and second ends of the housing contacts the endplate, including the step of compressing the housing against the endplate by moving the second end of the housing axially along the second end of the anchor rod in the direction of the interior of the generator.

6. The method of claim 5 including means for moving the second end of the housing axially along the second end of the anchor rod comprising a hollow hydraulic cylinder that captures the anchor rod within its piston and pushes the second end of the housing along the anchor rod.

7. The method of claim 5 including the step of providing a pedestal that is rigidly attached to the housing at the portion of the housing intermediate the first and second ends of the housing that contacts and transmits the compressive load to the endplate.

8. The method of claim 1 wherein the leveraging step leverages compression tools respectively off of key bars.

9. The method of claim 1 wherein the leveraging step applies a compressive load of approximately 77.333 lbs (343.99 KN) of loading on the endplate respectively at a location adjacent each of the end portions of the plurality of key bars.

10. The method of claim 1 including the step of holding core laminations of the generator together when the endplate is removed with a plurality of anchor rods respectively positioned with wood slot filler in empty coil slots in the core laminations.

11. The method of claim 1 including the step of leveraging the separate compression tools off of the generator frame at a plurality of locations around a circumference of the generator at the same time to apply a compressive load upon a face of a generator lamination to compress a plurality of laminations together after some of the plurality of laminations have been replaced.

12. The method of claim 11 wherein the compression tool comprises a housing having a first end pivotally attached to the generator frame, the compression tool further comprising an anchor rod that extends through the interior of the generator and is anchored at a first end of the anchor rod against a second axial end of the generator and connected at a second end of the anchor rod proximate to a second end of the housing of the compression tool such that the second end of the housing can move axially along the anchor rod and a push rod extending axially from and supported by the housing intermediate the first and second ends of the housing the push rod at an extended end contacting the face of the generator lamination, including the step of compressing the plurality of laminations by moving the second end of the housing axially along the second end of the anchor rod in the direction of the laminations.

* * * * *